(12) United States Patent
Bazarsky et al.

(10) Patent No.: US 11,853,562 B1
(45) Date of Patent: Dec. 26, 2023

(54) READ LOOK AHEAD BASED ON KEY ANALYSIS IN KEY VALUE DATA STORAGE DEVICES

(71) Applicant: Western Digital Technologies, Inc., San Jose, CA (US)

(72) Inventors: Alexander Bazarsky, Holon (IL); David Avraham, Even Yehuda (IL); Ran Zamir, Ramat Gan (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/829,481

(22) Filed: Jun. 1, 2022

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ..... G06F 3/0622; G06F 3/0655; G06F 3/0679
See application file for complete search history.

(56) References Cited

U.S. PATENT DOCUMENTS

| | | | | |
|---|---|---|---|---|
| 2013/0198198 A1* | 8/2013 | Tsuchimoto | ........ | G06F 16/2228 707/741 |
| 2019/0163616 A1* | 5/2019 | Govindaraju | ....... | G06F 11/3688 |
| 2021/0117384 A1* | 4/2021 | Leite Pinheiro de Paiva | .............. | G06F 16/9574 |

OTHER PUBLICATIONS

Kim, et al., The Key to Value: Understanding the NVMe Key-Value Standard, Live Website, Sep. 1, 2020, SNIA NSF, Networking Storage, 31 pp.
Adams, NVMe® Base Specification 2.0 Preview, Flash Memory Summit, 2020, NVM Express organization, 20 pp.
Samsung Key Value SSD Enables High Performance Scaling, A Technology Brief by Samsung Memory Solutions Lab, Samsung Electronics, Co. Ltd., 2017, 8 pp.
Martin, et al, NVM Express Technical Proposal for New Feature, Jun. 2020, NVM Express, Inc., 34 pp.

* cited by examiner

*Primary Examiner* — Jane W Benner
(74) *Attorney, Agent, or Firm* — PATTERSON + SHERIDAN, LLP; Steven H. VerSteeg

(57) ABSTRACT

A data storage device includes a memory device and a controller coupled to the memory device. The controller is configured to program key value (KV) pair data to the memory device, where the KV pair data includes a key and a value, analyze the key, and generate metadata based on the analyzing. The controller is further configured to generate a metadata index for a plurality of KV pair data, where the metadata index value corresponds to a similarity or a difference between a first key and a second key, and cluster generated metadata based on the metadata index. The controller is further configured to receive a read command for the KV pair data, analyze the generated metadata of the KV pair data, generate a predicted next key, and use read look ahead (RLA) to read a predicted next KV pair data based on the predicted next key.

18 Claims, 4 Drawing Sheets

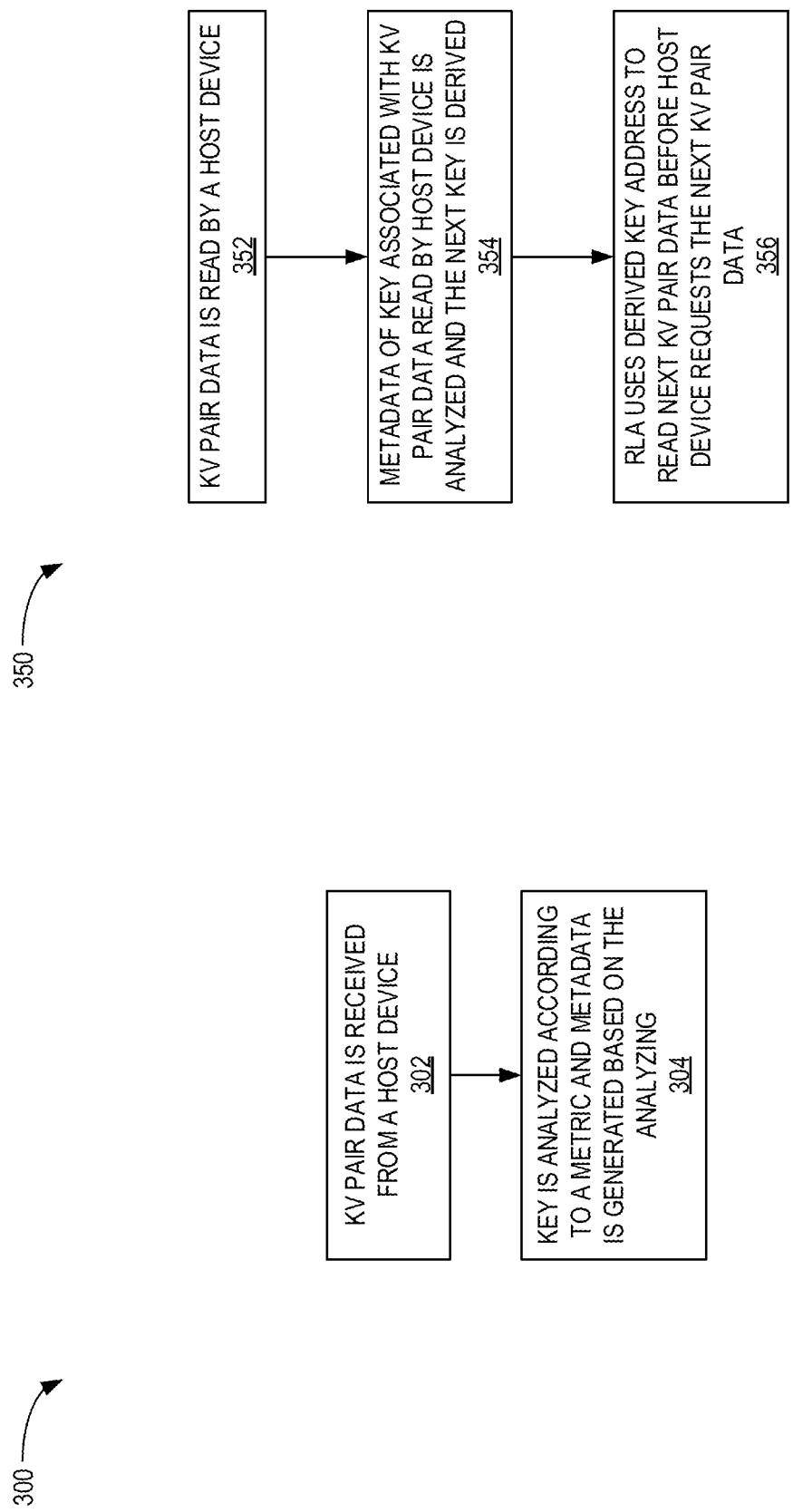

READ LOOK AHEAD BASED ON KEY ANALYSIS IN KEY VALUE DATA STORAGE DEVICES

BACKGROUND OF THE DISCLOSURE

Field of the Disclosure

Embodiments of the present disclosure generally relate to data storage devices, such as solid state drives (SSDs), and, more specifically, read look ahead (RLA) in key value (KV) data storage devices.

Description of the Related Art

A KV database works by storing a quantity of user data that is associated with a key that is addressable as a complete entity. Examples of user data that can be stored in a KV database may include photos, records, and files. From a host device point-of-view, the photo, the record, or the file may be retrieved using a single key/address, rather than using multiple addresses that include data of the photo, the record, or the file. The data is stored as unstructured data and may be addressed using a key of variable length. Storage space of a memory device may be allocated for KV pair data in increments of bytes, where a length value of the KV pair data is associated with the necessary storage space to store the KV pair data.

Using a KV database in a data storage device may increase the performance of the data storage device. For example, the number of data transfers/second may be improved because the KV pair data to physical storage location translation layer in the host device may be removed. Furthermore, the number of commands over the bus may be reduced since an entire KV pair data may utilize a single transfer. KV pair data allows access to data on a data storage device using a key rather than a block address. Read look ahead (RLA) is a mechanism to read data from a memory device of the data storage device before a host device requests the data. In other words, the data storage device may predict which data the host device may request to read. In non-KV data storage devices, the RLA mechanism may rely on hints, explicit directions from the host device, which may be a dataset management (DSM) hint, or learning mechanisms that predicts a next logical block address (LBA) based on previous host read requests.

Therefore, there is a need in the art for an improved read look ahead mechanism for KV data storage devices based on key analysis.

SUMMARY OF THE DISCLOSURE

The present disclosure generally relates to data storage devices, such as solid state drives (SSDs), and, more specifically, read look ahead (RLA) in key value (KV) data storage devices. A data storage device includes a memory device and a controller coupled to the memory device. The controller is configured to program key value (KV) pair data to the memory device, where the KV pair data includes a key and a value, analyze the key, and generate metadata based on the analyzing. The controller is further configured to generate a metadata index for a plurality of KV pair data, where the metadata index value corresponds to a similarity or a difference between a first key and a second key, and cluster generated metadata based on the metadata index. The controller is further configured to receive a read command for the KV pair data, analyze the generated metadata of the KV pair data, generate a predicted next key, and use read look ahead (RLA) to read a predicted next KV pair data based on the predicted next key.

In one embodiment, a data storage device includes a memory device and a controller coupled to the memory device. The controller is configured to program key value (KV) pair data to the memory device, where the KV pair data includes a key and a value, analyze the key, and generate metadata based on the analyzing.

In another embodiment, a data storage device includes a memory device and a controller coupled to the memory device. The controller is configured to receive a read command for key value (KV) pair data stored in the memory device, where the KV pair data includes a key and a value, retrieve metadata corresponding to the KV pair data, and determine a next KV pair data to be read using a cluster relation table based on the retrieved metadata.

In another embodiment, a data storage device includes memory means and a controller coupled to the memory means. The controller is configured to generate metadata for key value (KV) pair data, assign a metadata index comparing a similarity of a first metadata of a first KV pair data to one or more of another metadata, where each of the one or more of the another metadata is associated with a different KV pair data than the first KV pair data, receive a read command to read the KV pair data, and retrieve a predicted next KV pair data based on the metadata index.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A is a flow diagram illustrating a method of receiving KV pair data from a host device, according to certain embodiments.

FIG. 3B is a flow diagram illustrating a method of response to KV pair data being read by a host device, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, read look ahead (RLA) in key value (KV) data storage devices. A data storage device includes a memory device and a controller coupled to the memory device. The controller is configured to program key value (KV) pair data to the memory device, where the KV pair data includes a key and a value, analyze the key, and generate metadata based on the analyzing. The controller is further configured to generate a metadata index for a plurality of KV pair data, where the metadata index value corresponds to a similarity or a difference between a first key and a second key, and cluster generated metadata based on the metadata index. The controller is further configured to receive a read command for the KV pair data, analyze the generated metadata of the KV pair data, generate a predicted next key, and use read look ahead (RLA) to read a predicted next KV pair data based on the predicted next key.

Figure 1:
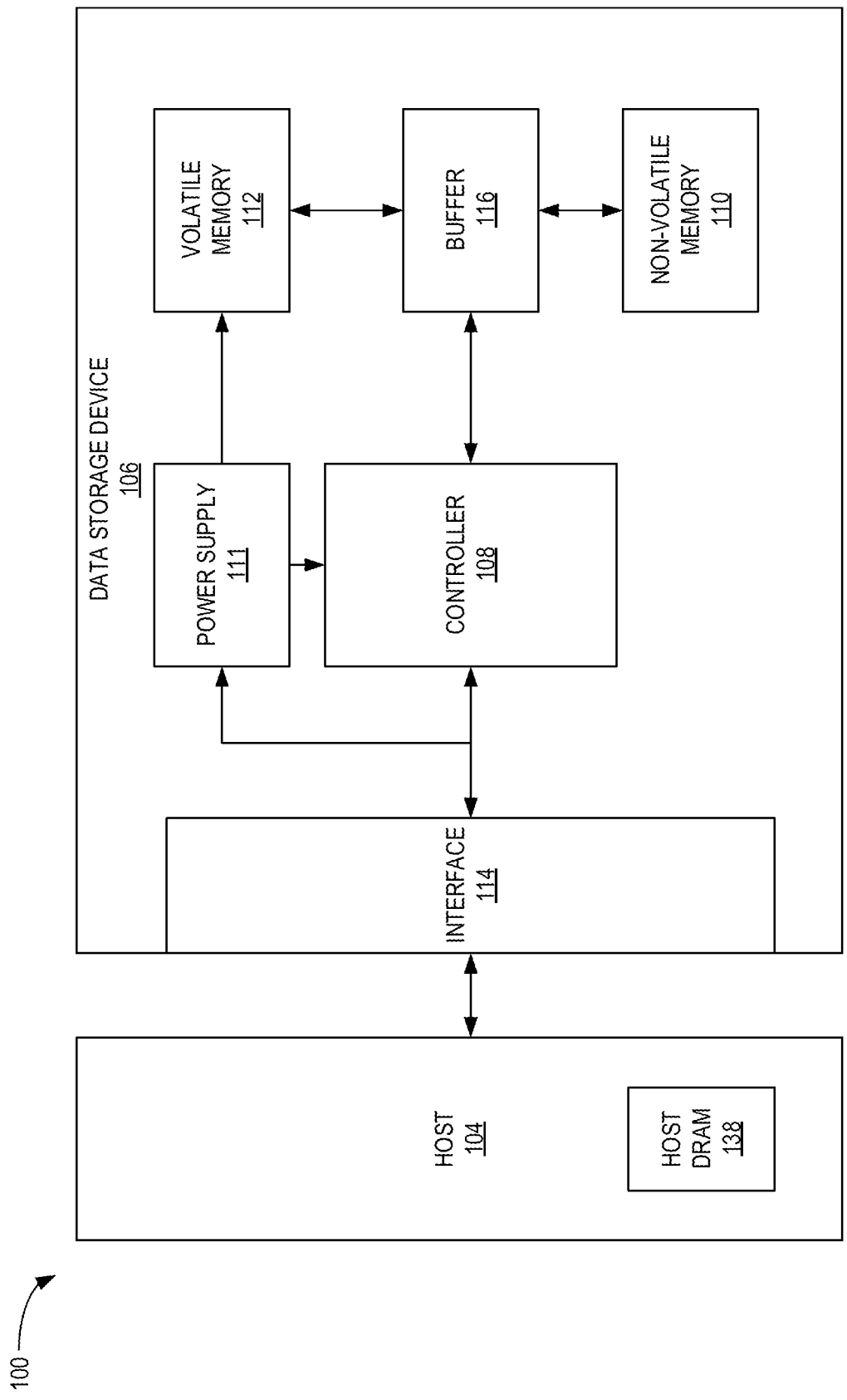
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108, such as SRAM memory, prior to sending the data to the NVM 110.

The controller 108 may generate metadata for the KV pair data based on the key of the KV pair data. The metadata may be based on the logical meaning of the corresponding key. Furthermore, because the controller 108 may generate metadata for the KV pair data based on the key of the KV pair data, the controller 108 may also classify the metadata of the key of the KV pair data as a type selected from a group that includes at least words, American Standard Code for Information Interchange (ASCII) Characters, mathematical expressions (or equations), a histogram of elements of the key, and the like. It is to be understood that other classifications may be applicable to the described embodiments. It is to be further understood that combinations of the previously mentioned classifications as well as the other classifications that may be applicable to the described embodiments are also contemplated.

The controller 108 may be further configured to sort and/or organize the keys based on the classification of the metadata. For example, keys having the classification of "words" may be separated in grouping from keys having the classification of "ASCII characters". Furthermore, the sorting and/or organizing may include ordering the keys according to a meaningful metric. For example, the meaningful metric may include order in words, ascending order in numbers, and the like. The order of the keys may be represented as a linked list in the volatile memory 112. The linked list may link a first key to a second key, where the first key and the second key are characterized in a same group. The linking may be completed such that when the first key is requested, the controller 108 may read and store the second key and corresponding value in the volatile memory 112 or an internal cache of the controller 108, such as SRAM, prior to receiving a read request for the second key is received. In other words, the controller 108 may fetch the second key and corresponding value pre-emptively. Thus, the controller 108 may utilize read look ahead (RLA) to read the second key and corresponding value prior to receiving a read request for the second key.

The controller 108 may generate, maintain, and update a cluster relationship table, which may be stored in the volatile memory 112 or an internal cache of the controller 108, such as SRAM. The cluster relationship table may referred to as a table herein for simplification purposes. The metadata index for each KV pair data may be a value between 0 and 1, where a metadata index closer to 1 indicates that the compared KV pair data are more likely to be read next due to a similarity or association of the metadata of the compared KV pair data, and where a metadata index closer to 0 indicates that the compared KV pair data are less likely to be read next due to a dissimilarity or association of the metadata of the compared KV pair data.

In other words, a metadata index greater than or equal to about 0.5 indicates that the compared KV pair data have a higher probability of being read, where metadata indexes closer to 1 indicates that the compared KV pair data have a higher probability of being read than the compared KV pair data having metadata indexes closer to 0.5, and a metadata index less than about 0.5 indicates that the compared KV pair data are less likely of being read, where metadata indexes closer to 0 indicates that the metadata of the compared KV pair data are less likely to be read than the compared KV pair data having metadata indexes closer to 0.5. Thus, when a second KV pair data is read consecutively to a first KV pair data, the corresponding metadata index relating the first KV pair data to the second KV pair data may be increased. Conversely, when a second KV pair data is not read consecutively to a first KV pair data, the corresponding metadata index relating the first KV pair data to the second KV pair data may be decreased.

An example of the metadata indexes for a plurality of KV pair data is shown in Table 1 below.

TABLE 1

|  | KV Pair Data #1 | KV Pair Data #2 | ... | KV Pair Data #n |
|---|---|---|---|---|
| KV Pair Data #1 | x | 0.5 | ... | 0.5 |
| KV Pair Data #2 | 0.3 | x | ... | 0.1 |
| ... | ... | ... | ... | ... |
| KV Pair Data #n | 0.6 | 0.2 | ... | x |

It is noted that Table 1 may not be diagonally symmetrical. In other words, the probability, represented by the metadata indexes in Table 1, that a second KV pair data is read after a first KV pair data may depend on which KV pair data is read first. For example, referring to Table 1, if a first KV pair data #1 is read first, then the second KV pair data #2 has a corresponding metadata index of 0.5. However, if a second KV pair data #2 is read first, then the first KV pair data #1 has a metadata index of 0.3. It is to be understood that other relationship schemes and tracking methods may be utilized and applicable to the embodiments described herein.

When reading a first KV pair data, the controller 108 may utilize the table to retrieve the next KV pair data to be read using RLA. The next KV pair data to be read may have the highest metadata index compared to other metadata indexes of other KV pair data with respect to the first KV pair data. In other words, the metadata index relative to other relation values may determine which KV pair data is retrieved using RLA. In other words, the controller 108 may retrieve the address of the next read (e.g., next KV pair data to be read) using the metadata indexing of the table. Furthermore, the metadata indexes of Table 1 may be updated after each read request for KV pair data has been received and/or processed, after a threshold period of time has elapsed, when the data storage device 106 begins a background operations, combinations thereof, and the like. For example, a metadata index of a first KV pair data and a second KV pair data, where the first KV pair data is read first and the second KV pair data is read second, may be increased when the second KV pair data is read within (i.e., equal to or less than) a threshold time of reading the first KV pair data and decreased when the second KV pair data is not read within a threshold time of reading the first KV pair data.

Figure 2B:
FIG. 2B is a table illustrating a command set for a KV database, according to certain embodiments.
Figure 2A:
FIG. 2A is an exemplary illustration of a KV pair data, according to certain embodiments.

FIG. 2A is an exemplary illustration of a KV pair data 200, according to certain embodiments. KV pair data 200 includes a key 202 and a value 204, where the data, which may be host data, of the value 204 is addressed by the key 202. The key 202 may have a size of about 1 byte to about 64 bytes and the value 204 may have a size of about 0 bytes to about 232-1 bytes. For example, when the value 204 has a size of about 0 bytes, the value 204 is an empty value. It is to be understood that the previously mentioned values are not intended to be limiting, but to provide an example of an embodiment.

FIG. 2B is a table 250 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 202 and value 204 associated with the key 202. The list command may cause the controller 108 to list keys that exist in a KV namespace starting at a specified key. The exist command may cause the controller 108 to return a status indicating whether a KV pair data 200 exists for a specified key to the command generator, such as the host device 104. The store command may cause the controller 108 to store a KV pair data to a KV namespace.

The retrieve command may cause the controller 108 to retrieve the value 204 associated with a specified key from a KV namespace. The length to be retrieved of the KV pair data 200 is specified in the retrieve command and the location to transfer the KV pair data 200 is specified by either a scatter gather list (SGL) pointer or a physical region page (PRP) pointer in the retrieve command. If the specified length in the retrieve command is less than the length of the KV pair data 200 that is being retrieved, then the controller 108 returns the requested amount and the length of the KV pair data 200 to the completion queue. However, if the specified length in the retrieve command is greater than the length of the KV pair data 200 that is being retrieved, then the controller 108 returns the data from the NVM 110 and the length of the KV pair data 200 is returned to the completion queue.

FIG. 3A is a flow diagram illustrating a method 300 of receiving KV pair data from a host device, such as the host device 104 of FIG. 1, according to certain embodiments. Method 300 may be implemented by a controller, such as the controller 108 of FIG. 1, to generate metadata to be used in a cluster relationship table relating a first KV pair data to a second KV pair data based on a probability that the second KV pair data will be read subsequent to the first KV pair data. For exemplary purposes, aspects of the storage system 100 of FIG. 1 may be referenced herein. At block 302, KV pair data is received from the host device 104. At block 304, a key of the received KV pair data is analyzed according to a metric, such as the meaningful metric described in FIG. 1, and metadata is generated for the received KV pair data. The controller 108 may utilize the generated metadata to generate a linked list, update a generated linked list, generate a cluster relationship table, and/or update a cluster relationship table.

FIG. 3B is a flow diagram illustrating a method 350 of response to KV pair data being read by a host device, according to certain embodiments. Method 350 may be implemented by a controller, such as the controller 108 of FIG. 1, to derive a next KV pair data to be read based on metadata stored in a cluster relationship table. For exemplary purposes, aspects of the storage system 100 of FIG. 1 may be referenced herein.

At block 352, a first KV pair data is read by the host device 104. At block 354, metadata of the key associated with the first KV pair data is analyzed and the next key (and corresponding KV pair data) to be retrieved using RLA is derived. For example, the metadata may include a pointer linking the metadata to metadata of the next key based on a probability that the next key will be read next. The analyzing and retrieving may be completed in a hardware component of the controller 108. At block 356, the controller 108 utilizes RLA to retrieve the next KV pair data associated with the next key derived and stores the next KV pair data in cache, which may be SRAM of the controller 108 or the volatile memory 112. The retrieving of the next KV pair data using RLA may be completed prior to receiving a read request for the next KV pair data. In other words, the retrieving of the next KV pair data is a speculative retrieval, such that if the next read request is for the next KV pair data, time is saved.

Figure 4B:
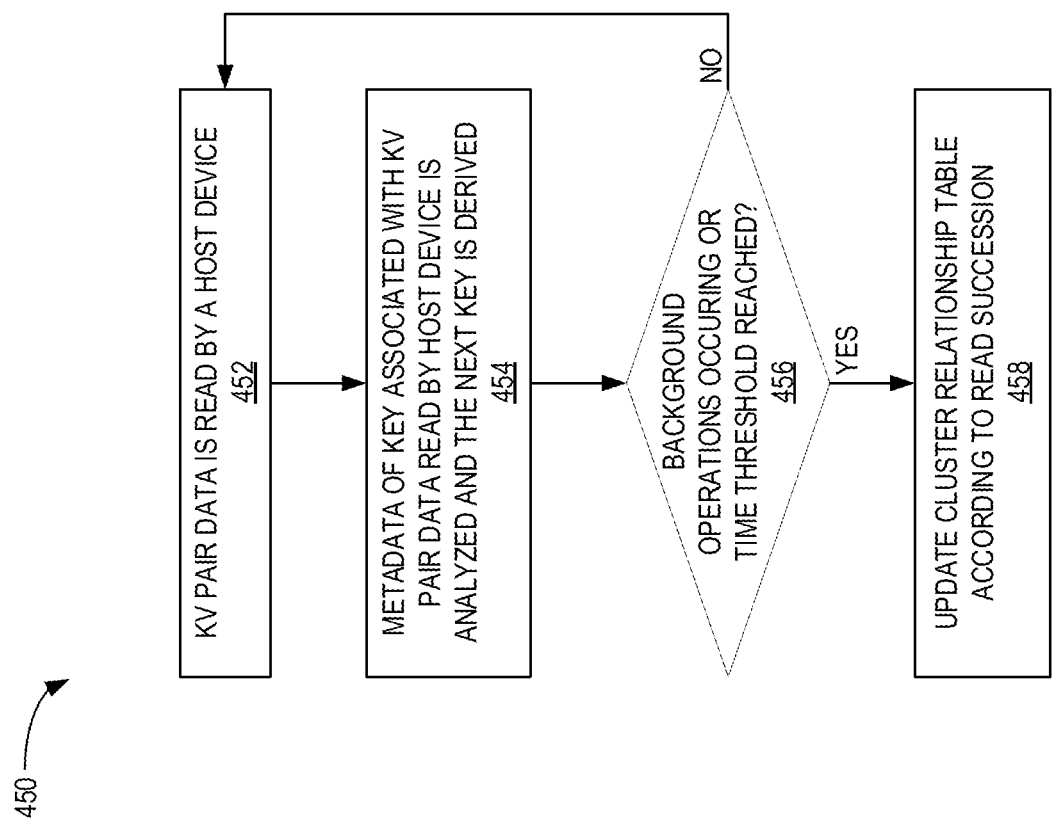
FIG. 4B is a flow diagram illustrating a method of updating a cluster relationship table, according to certain embodiments.
Figure 4A:
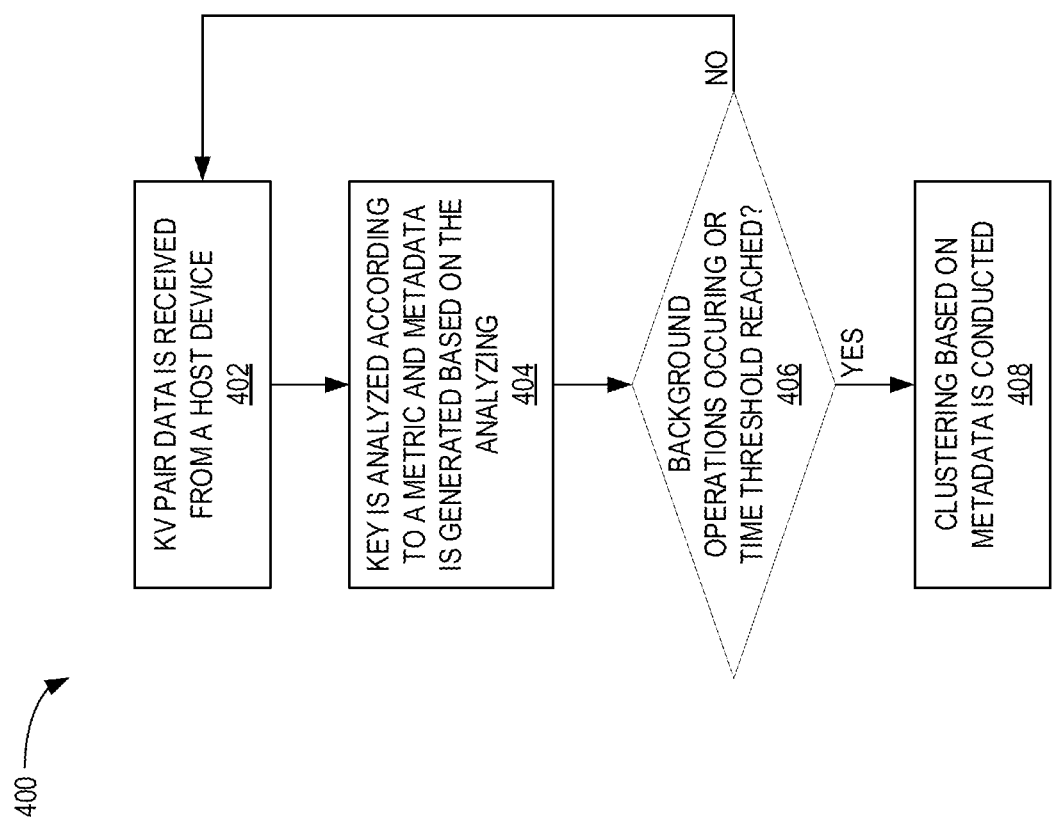
FIG. 4A is a flow diagram illustrating a method of clustering metadata, according to certain embodiments.

FIG. 4A is a flow diagram illustrating a method 400 of clustering metadata, according to certain embodiments. Method 400 may be implemented by a controller, such as the controller 108 of FIG. 1, to cluster metadata in a cluster relationship table relating a first KV pair data to a second KV pair data based on a probability that the second KV pair data will be read subsequent to the first KV pair data. For exemplary purposes, aspects of the storage system 100 of FIG. 1 may be referenced herein.

At block 402, KV pair data is received from the host device 104. At block 404, a key of the received KV pair data is analyzed according to a metric, such as the meaningful metric described in FIG. 1, and metadata is generated for the received KV pair data. The controller 108 may utilize the generated metadata to generate a linked list, update a generated linked list, generate a cluster relationship table, and/or update a cluster relationship table. At block 406, the controller 108 determines if the data storage device 106 is completing background operations or if a time since last update has reached or exceeded a threshold. If the data storage device 106 is completing background operations or the time since last update has reached or exceeded the threshold at block 406, then the controller 108 updates the linked list or the cluster relationship table based on updated metadata of each KV pair data received between the updating at block 408. However, if the data storage device 106 is not completing background operations or the time since last update has not reached or exceeded the threshold at block 406, then method 400 returns to block 402. It is to be understood that other mechanisms of updating the cluster relationship table is contemplated and may be applicable to the described embodiments.

FIG. 4B is a flow diagram illustrating a method 450 of updating a cluster relationship table, according to certain embodiments. Method 450 may be implemented by a controller, such as the controller 108 of FIG. 1, to update a cluster relationship table relating a first KV pair data to a second KV pair data based on a probability that the second KV pair data will be read subsequent to the first KV pair data. For exemplary purposes, aspects of the storage system 100 of FIG. 1 may be referenced herein.

At block 452, a first KV pair data is read by the host device 104. At block 454, metadata of the key associated with the first KV pair data is analyzed and the next key (and corresponding KV pair data) to be retrieved using RLA is derived. For example, the metadata may include a pointer linking the metadata to metadata of the next key based on a probability that the next key will be read next. The analyzing and retrieving may be completed in a hardware component of the controller 108. At block 456, the controller 108 determines if the data storage device 106 is completing background operations or if a time since last update has reached or exceeded a threshold. If the data storage device 106 is not completing background operations or the time since last update has not reached or exceeded the threshold at block 456, then method 450 returns to block 452. However, if the data storage device 106 is completing background operations or the time since last update has reached or exceeded the threshold at block 406, then the controller 108 updates the cluster relationship table based on an order of reads of KV pair data between the updating at block 458. It is to be understood that other mechanisms of updating the cluster relationship table is contemplated and may be applicable to the described embodiments.

By grouping similar KV pair data together based on the keys of the KV pair data and determining a probability that a certain KV pair data will be retrieved subsequent to retrieving a corresponding KV pair data, read look ahead may be utilized by the controller and quality of service of random value read workloads of KV data storage devices may be improved.

In one embodiment, a data storage device includes a memory device and a controller coupled to the memory device. The controller is configured to program key value (KV) pair data to the memory device, where the KV pair data includes a key and a value, analyze the key, and generate metadata based on the analyzing.

The analyzing occurs when the controller is performing background operations. The controller is further configured to classify the key as a type selected from a group consisting of words, American Standard Code for Information Interchange (ASCII) characters, and mathematical expressions. The controller is further configured to aggregate and order one or more keys in a linked list. A linked list links a first key to a second key. The aggregating and the ordering is based on the classifying. The linked list is stored in random access memory (RAM). The generated metadata comprises at least one of a length of the key, a histogram of elements of the key, and a time since the key was read. The controller is further configured to generate a metadata index based on the analyzing. The metadata index indicates a similarity between the key and another key. A high similarity indicates a higher chance for the key and the another key to be read subsequently and a lower similarity indicates a lower chance for the key and the another key to be read subsequently. The controller is further configured to cluster two or more generated metadata based on the indicated similarity. The clustering occurs during background operations and after a threshold period of time has elapsed. The controller is further configured to receive a read command for the KV pair data, analyze the generated metadata of the KV pair data, and generate a predicted next key. The predicted next key corresponds to the another key having the high similarity to the key. The controller is further configured to use read look ahead (RLA) to read a predicted next KV pair data based on the predicted next key.

In another embodiment, a data storage device includes a memory device and a controller coupled to the memory device. The controller is configured to receive a read command for key value (KV) pair data stored in the memory device, where the KV pair data includes a key and a value, retrieve metadata corresponding to the KV pair data, and determine a next KV pair data to be read using a cluster relation table based on the retrieved metadata.

The controller is further configured to perform read look ahead (RLA) using the determining. The cluster relation table stores a similarity matrix comparing first metadata of a first key of a first KV pair data to second metadata of a second key of a second KV pair data. Each entry of the similarity matrix stores a metadata index. A metadata index greater than a predetermined threshold indicates that a corresponding KV pair data has a high probability of being read next and a lower metadata index lower than the predetermined threshold indicates that the corresponding KV pair data has a low probability to be read next. The next KV pair data to be read corresponds to an entry corresponding to the KV pair data having a highest metadata index. The controller is further configured to update the cluster relation table after each KV pair data read.

In another embodiment, a data storage device includes memory means and a controller coupled to the memory means. The controller is configured to generate metadata for key value (KV) pair data, assign a metadata index comparing a similarity of a first metadata of a first KV pair data to one or more of another metadata, where each of the one or more of the another metadata is associated with a different KV pair data than the first KV pair data, receive a read command to read the KV pair data, and retrieve a predicted next KV pair data based on the metadata index.

The retrieving includes using read look ahead (RLA). The retrieved predicted next KV pair data is stored in the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
program key value (KV) pair data to the memory device, wherein the KV pair data includes a key and a value;
analyze the key; and
generate metadata based on the analyzing, wherein the controller is further configured to classify the key as a type selected from a group consisting of words, American Standard Code for Information Interchange (ASCII) characters, and mathematical expressions, wherein the controller is further configured to aggregate and order one or more keys in a linked list, wherein a linked list links a first key to a second key, and wherein the aggregating and the ordering is based on the classifying.

2. The data storage device of claim 1, wherein the analyzing occurs when the controller is performing background operations.

3. The data storage device of claim 1, wherein the linked list is stored in random access memory (RAM).

4. The data storage device of claim 1, wherein the generated metadata comprises at least one of a length of the key, a histogram of elements of the key, and a time since the key was read.

5. The data storage device of claim 1, wherein the controller is further configured to generate a metadata index based on the analyzing.

6. The data storage device of claim 5, wherein the metadata index indicates a similarity between the key and another key, and wherein a similarity greater than or equal to 0.5 indicates a higher chance for the key and the another key to be read subsequently as compared to not being read subsequently and a similarity less than 0.5 indicates a lower chance for the key and the another key to be read subsequently as compared to being read subsequently.

7. The data storage device of claim 6, wherein the controller is further configured to cluster two or more generated metadata based on the indicated similarity.

8. The data storage device of claim 7, wherein the clustering occurs during background operations and after a threshold period of time has elapsed.

9. The data storage device of claim 6, wherein the controller is further configured to:
receive a read command for the KV pair data;
analyze the generated metadata of the KV pair data; and
generate a predicted next key, wherein the predicted next key corresponds to the another key.

10. The data storage device of claim 9, wherein the controller is further configured to use read look ahead (RLA) to read a predicted next KV pair data based on the predicted next key.

11. A data storage device, comprising:
a memory device; and
a controller coupled to the memory device, wherein the controller is configured to:
receive a read command for key value (KV) pair data stored in the memory device, wherein the KV pair data includes a key and a value;
classify the key as a type selected from a group consisting of words, American Standard Code for Information Interchange (ASCII) characters, and mathematical expressions;
aggregate and order one or more keys in a linked list, wherein a linked list links a first key to a second key, and wherein the aggregating and the ordering is based on the classifying;
retrieve metadata corresponding to the KV pair data; and
determine a next KV pair data to be read using a cluster relation table based on the retrieved metadata.

12. The data storage device of claim 11, wherein the controller is further configured to perform read look ahead (RLA) using the determining.

13. The data storage device of claim 11, wherein the cluster relation table stores a similarity matrix comparing first metadata of a first key of a first KV pair data to second metadata of a second key of a second KV pair data.

14. The data storage device of claim 13, wherein each entry of the similarity matrix stores a metadata index, and wherein a metadata index greater than a predetermined threshold indicates that a corresponding KV pair data has a higher probability of being read next as compared to not being read next and a lower metadata index lower than the predetermined threshold indicates that the corresponding KV pair data has a lower probability to be read next as compared to being read next.

15. The data storage device of claim 14, wherein the next KV pair data to be read corresponds to an entry corresponding to the KV pair data having a highest metadata index.

16. The data storage device of claim 11, wherein the controller is further configured to update the cluster relation table after each KV pair data read.

17. A data storage device, comprising:
memory means; and
a controller coupled to the memory means, wherein the controller is configured to:
generate metadata for key value (KV) pair data;
assign a metadata index comparing a similarity of a first metadata of a first KV pair data to one or more of another metadata, wherein each of the one or more of the another metadata is associated with a different KV pair data than the first KV pair data;
classify a key as a type selected from a group consisting of words, American Standard Code for Information Interchange (ASCII) characters, and mathematical expressions;
aggregate and order one or more keys in a linked list, wherein a linked list links a first key to a second key, and wherein the aggregating and the ordering is based on the classifying;
receive a read command to read the KV pair data; and
retrieve a predicted next KV pair data based on the metadata index.

18. The data storage device of claim 17, wherein the retrieving comprises using read look ahead (RLA), and wherein the retrieved predicted next KV pair data is stored in the memory means.

* * * * *